United States Patent
Diab et al.

(10) Patent No.: US 8,028,175 B2
(45) Date of Patent: Sep. 27, 2011

(54) SYSTEM AND METHOD FOR POWER SOURCING EQUIPMENT DETECTION OF A POWERED DEVICE POWER FAILURE FOR POWER BACKUP

(75) Inventors: Wael William Diab, San Francisco, CA (US); Sesha Thalpasai Panguluri, Santa Clara, CA (US); Hemanth Nekkileru, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 777 days.

(21) Appl. No.: 12/048,281

(22) Filed: Mar. 14, 2008

(65) Prior Publication Data

US 2009/0235093 A1      Sep. 17, 2009

(51) Int. Cl.
*G06F 1/00*        (2006.01)
*G06F 11/30*      (2006.01)
(52) U.S. Cl. .................... 713/300; 713/310; 713/340
(58) Field of Classification Search .............. 713/300
See application file for complete search history.

(56) References Cited

U.S. PATENT DOCUMENTS

| | | | | |
|---|---|---|---|---|
| 6,847,718 | B1 * | 1/2005 | Hiraoka .................. | 379/413 |
| 6,996,729 | B2 * | 2/2006 | Volkening et al. ............ | 713/300 |
| 7,340,325 | B2 * | 3/2008 | Sousa et al. .................. | 700/295 |
| 7,343,506 | B1 * | 3/2008 | Fenwick .................. | 713/340 |
| 7,472,290 | B2   | 12/2008 | Diab et al. | |
| 7,478,251 | B1   | 1/2009 | Diab et al. | |
| 7,698,580 | B2 * | 4/2010 | Schindler et al. ............. | 713/300 |
| 7,752,472 | B2 * | 7/2010 | Diab et al. .................. | 713/310 |
| 7,761,719 | B2 * | 7/2010 | Ghoshal et al. ............... | 713/300 |
| 7,765,421 | B2 * | 7/2010 | Fenwick .................. | 713/340 |
| 2006/0143583 | A1 * | 6/2006 | Diab et al. .................. | 716/4 |
| 2007/0030613 | A1 * | 2/2007 | Sousa et al. .................. | 361/92 |
| 2008/0052546 | A1 * | 2/2008 | Schindler et al. ............. | 713/300 |
| 2009/0217062 | A1 * | 8/2009 | Diab .................. | 713/310 |

OTHER PUBLICATIONS

Fred Schindler, "Vport ad hoc discussion," Sep. 2006.
Fred Schindler, "Vport ad hoc discussion," Nov. 2006.

* cited by examiner

*Primary Examiner* — Suresh Suryawanshi
(74) *Attorney, Agent, or Firm* — Duane S. Kobayashi

(57) ABSTRACT

A system and method for power sourcing equipment (PSE) detection of a powered device (PD) power failure for power backup. A PSE can power a PD at a low level of power as a backup power source. Upon a failure in the PDs primary power source, the PSE can detect a transient (e.g., current and/or voltage) on the PD load as a signal that the PD requires additional power. The PSE can then allocate increased power to the port by entering into an active state as compared to a backup state. As the PSE is responsive to the detection of the transient, the PSE need not rely on a real-time communication from the PD.

19 Claims, 4 Drawing Sheets

SYSTEM AND METHOD FOR POWER SOURCING EQUIPMENT DETECTION OF A POWERED DEVICE POWER FAILURE FOR POWER BACKUP

BACKGROUND

1. Field of the Invention

The present invention relates generally to power over Ethernet (PoE) and, more particularly, to a system and method for power sourcing equipment (PSE) detection of a powered device (PD) power failure for power backup.

2. Introduction

In a PoE application such as that described in the IEEE 802.3af and 802.3at specifications, a power sourcing equipment (PSE) can deliver power to a powered device (PD) over Ethernet cabling. Various types of PDs exist, including voice over IP (VoIP) phones, wireless LAN access points, Bluetooth access points, network cameras, computing devices, etc.

In accordance with IEEE 802.3af, a PSE can deliver up to 15.4 W of power to a single PD over two wire pairs. In accordance with IEEE 802.at, on the other hand, a PSE may be able to deliver up to 30 W of power to a single PD over two wire pairs. Other proprietary solutions can potentially deliver higher or different levels of power to a PD. A PSE may also be configured to deliver power to a PD using four wire pairs.

In one application, PoE can be used to provide power backup for a device. In other words, the device can be designed to receive power primarily from a local power source such as a power-supply brick plugged into a wall outlet or power strip. Only in the event of a failure in the local power source would the device need to be supplied with power from the backup PoE power source. In this power backup application, it is important that the transition between the primary local power source and the backup PoE power source occurs seamlessly. What is needed therefore is a mechanism that enables a PSE to transition from a backup power source to a primary power source in a smooth and rapid fashion.

SUMMARY

A system and/or method for power sourcing equipment (PSE) detection of a powered device (PD) power failure for power backup, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
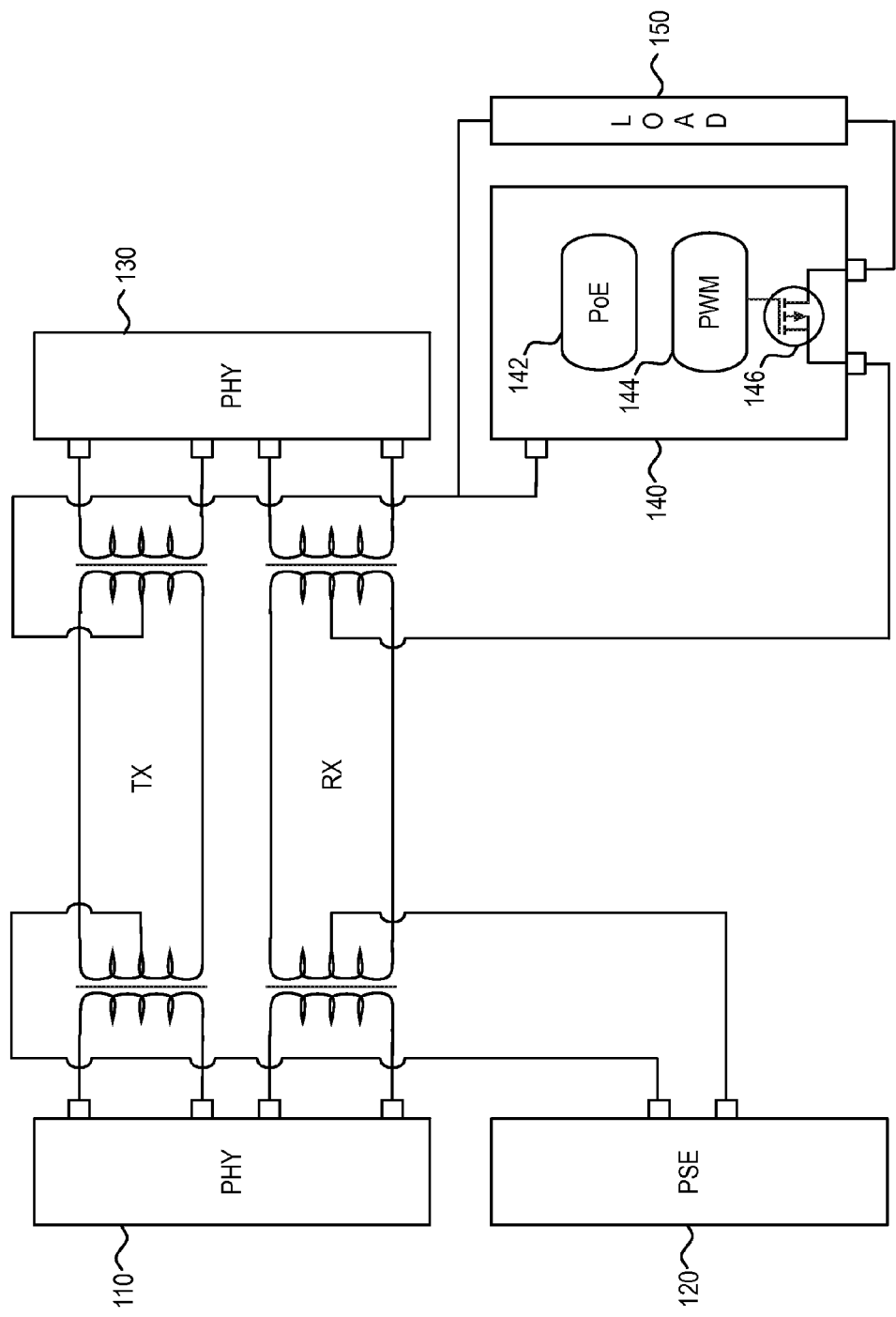
FIG. 1 illustrates an embodiment of a PoE system.

FIG. 1 illustrates an embodiment of a PoE system. As illustrated, the PoE system includes PSE 120 that transmits power to PD 140. Power delivered by PSE 120 to PD 140 is provided through the application of a voltage across the center taps of transformers that are coupled to a transmit (TX) pair and a receive (RX) pair of wires carried within an Ethernet cable. In general, the TX/RX pair can be found in, but not limited to structured cabling. The two TX and RX pairs enable data communication between Ethernet PHYs 110 and 130 in accordance with 10BASE-T, 100BASE-TX, 1000BASE-T, 10GBASE-T and/or any other layer 2 PHY technology. Here, it should be noted that PoE does not require the presence of a PHY.

As is further illustrated in FIG. 1, PD 140 includes PoE module 142. PoE module 142 includes the electronics that would enable PD 140 to communicate with PSE 120 in accordance with a PoE standard such as IEEE 802.3af, 802.3at, legacy PoE transmission, or any other type of PoE transmission. PD 140 also includes pulse width modulation (PWM) DC:DC controller 144 that controls power FET 146, which in turn provides constant power to load 150.

In the example of the IEEE 802.3af standard, PSE 120 can deliver up to 15.4 W of power to a plurality of PDs (only one PD is shown in FIG. 1 for simplicity). In the IEEE 802.at specification, on the other hand, a PSE may be able to deliver up to 30 W of power to a PD over two wire pairs. A PSE may also be configured to deliver power to a PD using four wire pairs. Other proprietary solutions can potentially deliver higher or different levels of power to a PD. In general, high power solutions are often limited by the limitations of the cabling.

A conventional application of PoE is as a primary power source for a PD. In this application, the PSE would have the sole responsibility for providing power to one or more PDs. Any failure in the PoE system or oversubscription in the available PSE power would lead to a shut down or diminished operation of the PD. For this reason, much effort has been expended in identifying various mechanisms that would ensure that the PSE provides a consistent source of power to as many PDs as possible. In another application, PoE could be used either at a subset of its power delivery or even at full delivery but for a secondary function, such as powering additional functions and/or charging a battery, etc.

In yet another application, the PoE system can be designed to operate as a backup source of power instead of as a primary source of power. In this application, the PD would be powered primarily from a local power source, and not from the PSE. In one example, the PD could receive power from the PSE only upon some failure in the local power source. As would be appreciated, the PSE can be designed to operate as both a primary source of power and a backup source of power to selected PDs that are connected to the PSE.

One of the issues in using a PSE as a backup source of power is the management of the transition between power sources. As would be appreciated, a failure in the local source of power would often result in a serious disruption in the operation of the PD. This disruption in operation can lead to inconsistent and/or undefined PD behavior in the process of responding to the failure in the local power source. Here, the potential for the device shutting down, rebooting and/or misbehaving or operating unreliably can make any attempt to using PoE as a backup power source unrealistic.

In various implementations, the operation of the device when using secondary power may be (1) the same as normal where the PoE and non-PoE power source are capable of delivering the same power, (2) a subset of the functionality if the PoE source can only provide a lower amount of power, or (3) a subset of the functionality during the hardware initiation state of the PoE (including hardware classification) that may transition into a different subset of functionality or full functionality when a further classification process (e.g., Layer 2 engine) of the PoE system completes.

Figure 2:
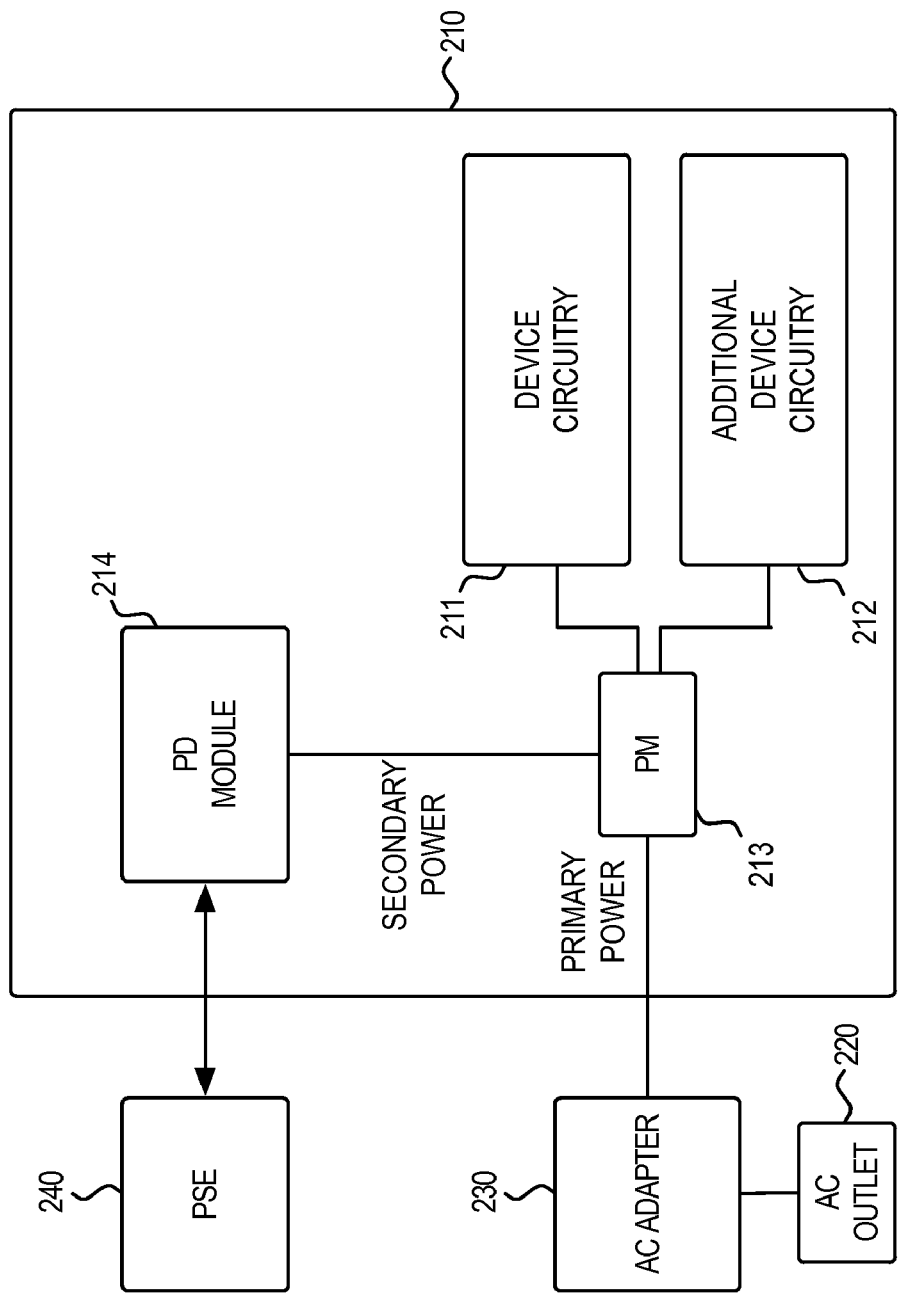
FIG. 2 illustrates an embodiment of a PoE system that is used for backup power.

FIG. 2 illustrates an example of a PoE system that is designed to utilize a secondary source of power. As illustrated, device 210 uses AC outlet 220 and AC adapter 230 as its primary source of power. The primary power received from this local power source is fed to power management (PM) 213, which feeds the needed power to device circuitry 211 and additional device circuitry 212. Here, device circuitry 211 represents those components that enable device 210 to perform its primary function (e.g., VOIP phone, wireless LAN access point, laptop, etc.), while additional device circuitry 212 represents those components that enable device 210 to perform secondary functions. The feeding by PM 213 of power from AC adapter 230 to device circuitry 211 and possibly secondary device circuitry 212 can represent the normal operating state of PD 210.

As illustrated, PM 213 is also designed to receive secondary power from PD module 214. It should be noted that PM 213 may be configured to operate as a switch if the PoE subsystem is operating as a backup power source. PM 213 may also be designed to manage a power pool that includes power from local and PoE power sources. Here, if one of the power sources falters, then the remaining power source can become the primary or even sole power supply.

In one embodiment, PD module 214 would include the electronics that would enable PoE communication with PSE 240 as well as a power module for generating secondary power. During the normal operating state of device 210 where PoE is used as a backup power source, PD module 214 can be maintained in any one of a variety of operating states. For example, PD module 214 can be designed to be maintained in any one of a pre-detection state, post-detection state, pre-classification state, post-classification state, or other pre-power application state. This can be the case because PD module 214 may not be used to actively power device 210 while power device 210 is in its normal operating state, but may be maintained in a state that can ultimately lead to a transition to a state of power application. As would be appreciated, the state in which PD module 214 is maintained would be implementation dependent. Here, the choice of state would be influenced by such factors as the source (e.g., remote PSE or local) and amount of power needed to maintain such state, the power request/priority or reservation protocol implemented by the PSE and PD module, the time to transition to the active use of secondary power from the PSE, etc.

It should be noted that PD module 214 can also be maintained in a powering state. This can be the case if it is part of the power pool that is managed by PM 213. In this scenario, the primary and secondary sources of power can be used to selectively power multiple pieces of functionality that exist in the device. In one example, this allocation can be based on the relative priority of the functionality. When either of the power sources falters in some way, a fallback state can be entered where certain functions are dropped or otherwise limited to thereby enable the resulting functionality to fit within the remaining power budget (or budget-ready sources).

PD module 214 can also be maintained in a powering state where the PSE is operating in an active standby state. Here, the PSE can be configured as a backup power source, where it provides only a low or minimal level of power to the PD. A transition to a higher level of power would only occur upon a failure or other disruption in the PD's primary power source.

In general, it is critical that a failure or other disruption in the local power source will produce a quick transition of the secondary power. This quick transition is key to providing consistent results in the response of the PD to such a failure or disruption. Where PD module 214 is maintained in an active power state, a transition of the secondary power is typically reliant on communications by the PD that indicate the occurrence of a failure or disruption and requesting a need for an increased power level. In one example, these real-time communications can be based on various Layer 2 communication mechanisms that enable a dynamic reclassification process.

The reliance on such real-time communication mechanisms to transition the secondary power produces various challenges. One of those challenges is the reaction speed. In this process, the PD would need to detect the primary power failure, formulate a new power request, and transmit such a request to the PSE. The time that it takes to complete this messaging process is critical in handling the loss of device functionality due to the loss of primary power. Inconsistent behavior between various PDs can therefore make such solutions unworkable.

In the present invention, it is recognized that the reliance on a messaging process initiated by the PD may not be sufficient to enable a PSE to function effectively as a backup power source. It is therefore a feature of the present invention that transitions of a PSE from a backup power source to a primary power source can be identified and controlled by the PSE. Prior to describing the principles of the present invention in greater detail, reference is made first to the illustration of FIG. 3, which shows a simple embodiment of a PSE.

As illustrated, PSE 310 includes microcontroller 311 along with memory 312. In one embodiment, microcontroller 311 can be responsible for controlling the detection and classification functionality. After detection and classification, the PSE 310 would delivery power to PD 320 using power controller 313. In one embodiment, power controller 313 would include a pulse width modulation (PWM) DC:DC controller that turns on a power FET (power switch), which allows current to be transmitted through it to PD 320.

After power delivery commences, microcontroller 311 can then monitor for disconnection of PD 320. Sensing the disconnection of the PD and turning off power is important to eliminate risks of damaged equipment. Conventionally, the PSE detects the disconnect condition by one of two methods and removes power upon such a detection. One method is the AC disconnect method. In this method, a small AC voltage is superimposed on the power and the resulting PD input impedance is measured. If the impedance is above a certain threshold, then the power on the port is turned off.

A second method is the DC disconnect method, which detects when the PD current falls below a given threshold for a given time. In one example, the PSE can monitor for the existence of a maintain power signature (MPS), which is characterized by a DC current of greater than or equal to 10 mA for a minimum of 60 ms every period of 300-400 ms. In contrast, the PSE can determine that the MPS is absent when it detects a DC current of less than 5 mA.

Figure 3:
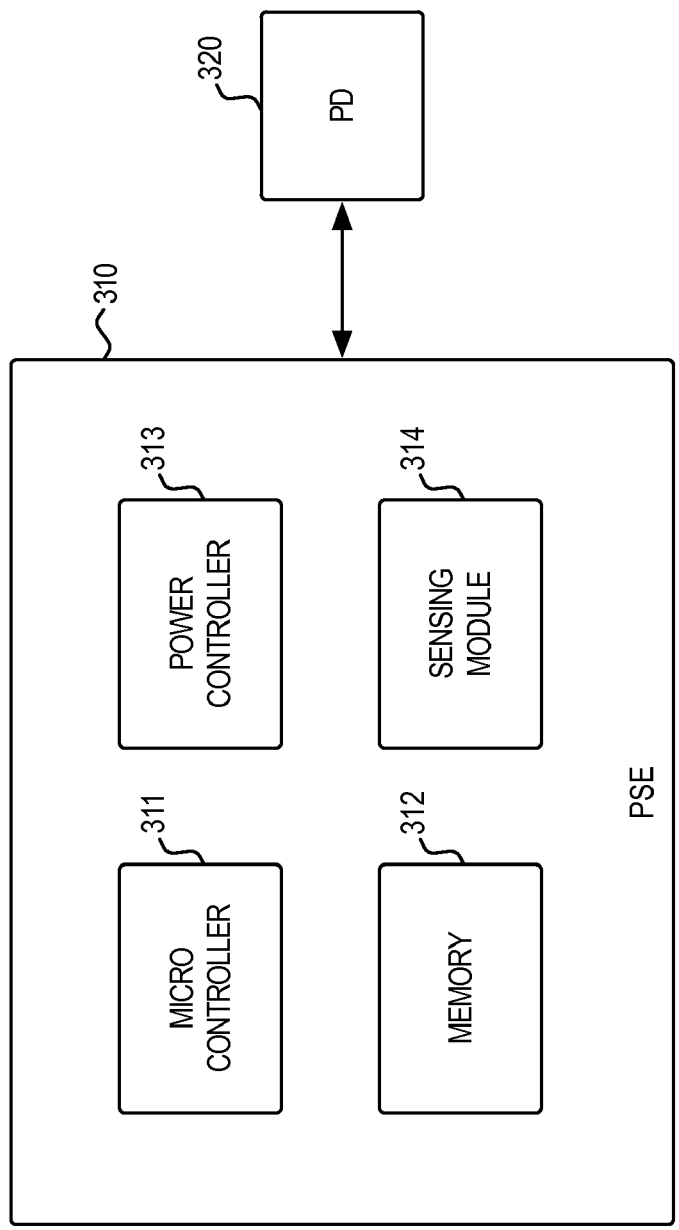
FIG. 3 illustrates an embodiment of a PSE.

In the illustrated embodiment of FIG. 3, current measurements such as that required for DC disconnection is provided by sensing module 314. In one embodiment, sensing module includes circuitry that enables sensing of current, voltage and die temperature. These measurements are digitized by an A/D converter and provided to microcontroller 311 for analysis. In operation, sensing module 314 can be operative to continually generate current, voltage and temperature measurements for analysis.

With the current and voltage measurements, the PSE can also perform a transient analysis on a port to determine whether predefined tolerances have been violated. For example, changes in the PD load could lead to unacceptable swings in current or voltage. This can certainly be the case when dealing with higher-power PDs. To limit the occurrence of these conditions, the PSE can examine the current and/or voltage transients relative to dI/dt (e.g., 30 mA/μs) and dV/dt (e.g., 3.5 V/μs) limits. If the limits are exceeded, then an illegal transient would be detected and power would be shut down on the port.

As described, conventional transient analysis is focused on the identification of illegal transients to disable functionality on a port. In contrast, the present invention recognizes that an identification of a legal transient can be used to enable increased functionality on a port.

In a power backup scenario, a PSE can be configured to operate as a backup power source in delivering a low or minimal amount of power. This low or minimal power level can be chosen to satisfy the prevailing conditions of the disconnect scheme that is being implemented. In this state, the PSE is active, yet in a standby mode. Transition from this active-standby mode to an active, fully functioning mode is dependent upon the occurrence of a failure or disruption in the primary power source local to the PD. As noted above, conventional solutions would be based on the communication of such a failure event to the PSE.

It is a feature of the present invention, that detection of such a power disruption event at the PD can be performed by the PSE without a real-time communication by the PD. This detection is enabled by the detection of a legal transient on the port.

In one example, this legal transient is produced as the PD load changes due to the power disruption event. When the primary power source is diminished, the PD voltage can drop as the PD current demand increases. In this scenario, the measurable current and/or voltage transient on the port is indicative of an increased draw by the PD on the PSE as a secondary power source. This transient need not be detected as an illegal transient. Rather, the transient can be confirmed as a legal transient that signals a need for additional power relative to the previous low or minimal power level. In the present invention, this indirect signaling will cause the PSE to transition from a secondary power source to a primary power source. Significantly, this occurs without any overt signaling by the PD. The end result is a transition process that is quick and efficient.

Figure 4:
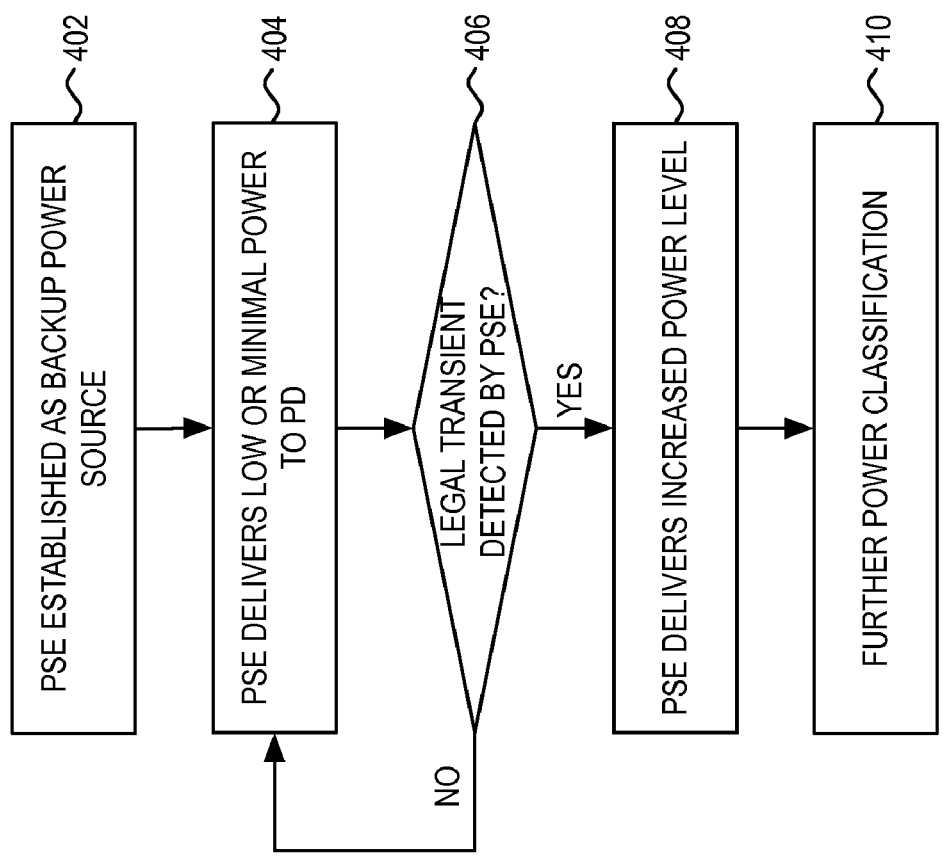
FIG. 4 illustrates a flowchart of a process of the present invention.

To further illustrate the principles of the present invention, reference is now made to the flowchart of FIG. 4. As illustrated, the process begins at step 402, where a PSE is established as a backup power source. As would be appreciated, the PSE may be established a priori as a backup power source through communication and/or configuration. Next, at step 404, the PSE delivers a low or minimal amount of power to the PD. As such, the PD is operating in a mode that actively delivers power, albeit at a minimal level. In this operating state, the PSE need not have the maximum power budgeted on that port. Rather, the maximum power would be budgeted only upon the occurrence of an event at the PD.

At step 406, the PSE would then monitor the port using a sensing module to determine whether a legal transient (e.g., dI/dt and/or dV/dt) is detected. In one embodiment, the definition of a legal transient can be established by the PSE itself, or through a communication by the PD. In the latter case, the PD can provide the PSE with a customized profile of a power ramp up that would be followed upon a failure or disruption in the local power source. As would be appreciated, this power ramp up would be dependent on the time needed to effect a smooth transition, the power required by the PD when leveraging the PSE as a backup power source, etc.

As noted, conventional systems monitor for illegal transients to reduce functionality. In the present invention, the PSE monitors for legal transients to increase functionality. If no legal transients are detected at step 406, then the PSE continues to deliver the low or minimal power to the PD. In other words, the PSE remains in the backup state. On the other hand, if a legal transient is detected at step 406, then the PSE would transition out of the backup state into a primary power source role.

In one embodiment, this transition would primarily include an increased power budget being applied to that port at step 408. In one scenario, this increased power budget may have been previously established upon configuration of the PSE as a backup power source. In another scenario, this increased power budget may represent a default power level that can be further customized using subsequent dynamic power classification at step 410. Regardless of the power budget actually settled upon, it is significant that the initial increase in power level from the low or minimal power level occurs without a real-time communication by the PD. This real-time communication would delay the transition of the PSE out of the backup power state into a fully functioning state. Subsequent to the transition, PD communication can be used to further refine the operation of the PSE as a primary power source. As would be appreciated, these further communications can be performed using LLDP, LLDP-MED, OAM or any other Layer 2 protocol.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method in a power sourcing equipment for operating as a backup power source, comprising:
   delivering a first level of power on a port coupled to a powered device via a communication cable, said first level of power enables the power sourcing equipment to operate in an active standby mode for said powered device, wherein during said active standby mode said powered device is primarily powered by a local power source that delivers power to said powered device via a second cable separate from said communication cable;
   detecting a transient condition on said port, said transient condition being indicative of a failure in said local power source; and delivering a second level of power to said port in response to said detection of said transient condition, said second level of power being greater than said first level of power.

2. The method of claim 1, wherein said detecting comprises detecting a current transient.

3. The method of claim 1, wherein said detecting comprises detecting a voltage transient.

4. The method of claim 1, wherein said second level of power is a full load power of said powered device.

5. The method of claim 1, wherein said delivering of said second level of power is not based on a real time communication by said powered device.

6. A power sourcing equipment, comprising:
   a sensing module that measures a voltage or current on an output port while said power sourcing equipment is in a backup power source mode, wherein during said backup power source mode, a powered device coupled to said output port via a communication cable receives power from a local power source via a second cable separate from said communication cable; and
   a power controller that controls a delivery of power on said output port, said power controller increasing the power delivery by the power sourcing equipment to said powered device on said output port upon an indication of a voltage or current transient condition by said measurements by said sensing module, wherein said voltage or current transient condition is indicative of a failure in said local power source.

7. The power sourcing equipment of claim 6, wherein said sensing module includes an analog-to-digital converter.

8. The power sourcing equipment of claim 6, wherein said increase in power delivery by the power sourcing equipment is to a full power level for the powered device.

9. The power sourcing equipment of claim 6, further comprising a microcontroller that compares a voltage or current transient to a threshold.

10. The power sourcing equipment of claim 6, wherein said increase in said power delivery is not based on a real-time communication by the powered device.

11. A power over Ethernet method in a power sourcing equipment, comprising:
    delivering a first level of power to a port coupled to a powered device via a communication cable, wherein said first level of power in combination with a concurrent delivery of power from a local power source to said powered device is sufficient for said powered device to fully function, said local power source delivering power to said powered device via a cable different from said communication cable;
    detecting a transient condition on said port that is indicative of a failure in said local power source; and
    delivering a second level of power to said port in response to said detection of said transient condition, wherein said second level of power is designed to offset at least part of a reduction in capacity of said local power source.

12. The method of claim 11, wherein said transient condition is a current transient.

13. The method of claim 11, wherein said transient condition is a voltage transient.

14. The method of claim 11, wherein said first level of power enables the power sourcing equipment to operate in an active standby mode for said powered device.

15. The method of claim 11, wherein said first level of power is not used to support any functionality in said powered device.

16. The method of claim 11, wherein said first level of power is used to support only part of the functionality in said powered device.

17. The method of claim 11, wherein said second level of power is a full load power of said powered device.

18. The method of claim 11, wherein said second level of power enables reduced functionality in said powered device.

19. The method of claim 11, wherein said delivering of said second level of power is not based on a real time communication by said powered device.

\* \* \* \* \*